United States Patent
Ma et al.

(10) Patent No.: US 10,439,220 B2
(45) Date of Patent: Oct. 8, 2019

(54) NEGATIVE ELECTRODE MATERIAL FOR SECONDARY BATTERY, METHODE FOR PREPARING THE SAME, AND BATTERY CONTAINING THE SAME

(71) Applicant: CONTEMPORARY AMPEREX TECHNOLOGY CO., LIMITED, Ningde (CN)

(72) Inventors: Yunjian Ma, Ningde (CN); Wei Li, Ningde (CN); Haizu Jin, Ningde (CN); Yikuang Jin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 105 days.

(21) Appl. No.: 15/686,067

(22) Filed: Aug. 24, 2017

(65) Prior Publication Data
US 2018/0198123 A1 Jul. 12, 2018

(30) Foreign Application Priority Data
Jan. 11, 2017 (CN) .......................... 2017 1 0019296

(51) Int. Cl.
*H01M 4/583* (2010.01)
*H01M 10/0525* (2010.01)
(Continued)

(52) U.S. Cl.
CPC ............. *H01M 4/583* (2013.01); *H01M 4/04* (2013.01); *H01M 4/133* (2013.01); *H01M 4/1393* (2013.01); *H01M 4/362* (2013.01); *H01M 4/587* (2013.01); *H01M 4/62* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2012/0003509 A1* 1/2012 Gerber .................. H01G 11/30
429/9

FOREIGN PATENT DOCUMENTS

CN 103374338 A 10/2013
CN 104659370 A 5/2015

OTHER PUBLICATIONS

Office Action from corresponding Chinese Patent Application No. 201710019296.5, dated Feb. 25, 2019, 13 pages.

* cited by examiner

*Primary Examiner* — Karie O'Neill Apicella
(74) *Attorney, Agent, or Firm* — Tucker Ellis LLP

(57) ABSTRACT

The present application relates to a negative electrode material for a secondary battery. The negative electrode material includes an expanded graphite and an organic phase change material intercalated into the expanded graphite. The present application further relates to a method for preparing the negative electrode material and a secondary battery using the negative electrode material. Since the organic phase change material is intercalated into the expanded graphite, when an internal temperature of the secondary battery increases, the organic phase change material absorbs heat by phase change, which can improve the heat storage and energy storage capacity and the safety performance of the secondary battery. In addition, since the organic phase change material has certain viscosity and flexibility, the adhesion performance of the negative electrode material on the current collector can also be improved.

5 Claims, 1 Drawing Sheet

(51) Int. Cl.
  *H01M 4/04*      (2006.01)
  *H01M 4/133*     (2010.01)
  *H01M 4/1393*    (2010.01)
  *H01M 4/36*      (2006.01)
  *H01M 4/587*     (2010.01)
  *H01M 4/62*      (2006.01)
  *H01M 4/02*      (2006.01)

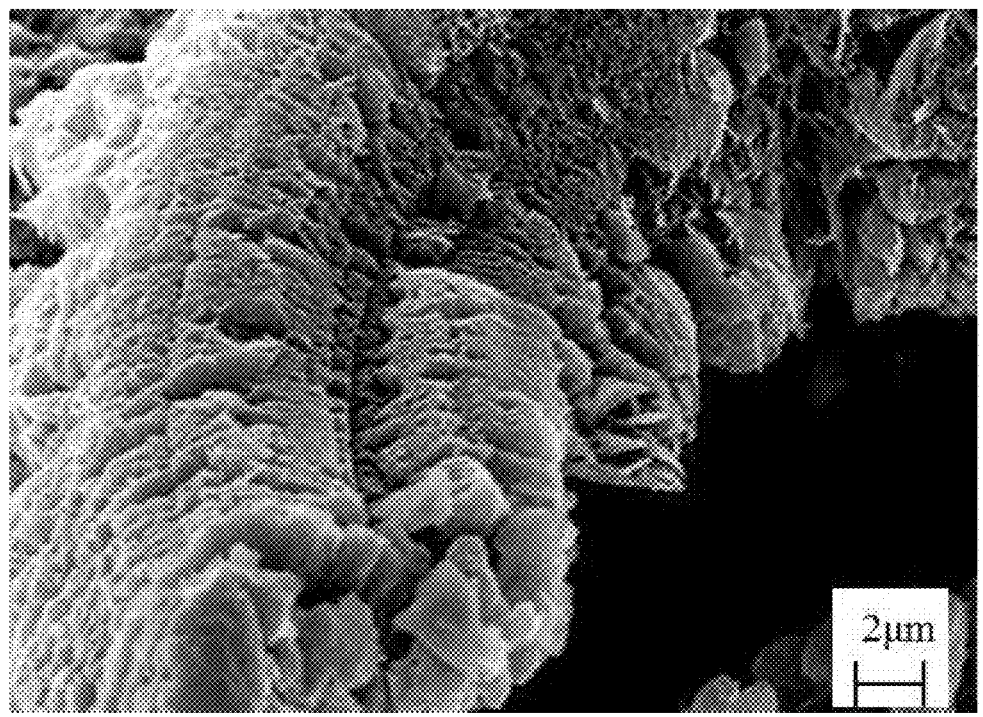

NEGATIVE ELECTRODE MATERIAL FOR SECONDARY BATTERY, METHODE FOR PREPARING THE SAME, AND BATTERY CONTAINING THE SAME

CROSS-REFERENCE TO RELATED APPLICATIONS

The present application claims the benefit of priority to Chinese Patent Application No. 201710019296.5, filed on Jan. 11, 2017, the content of which is incorporated herein by reference in its entirety.

TECHNICAL FIELD

The present application relates to the field of secondary batteries and, specifically, relates to a negative electrode material for a secondary battery, a method for preparing the negative electrode material, and the secondary battery using the negative electrode material as a negative active material.

BACKGROUND

A secondary battery, also called a rechargeable battery or a storage battery, refers to a battery reusable after discharging by a way in which an active material for the secondary battery can be re-activated by charging. At present, the most widely used Li-ion battery refers to a secondary battery, in which two compounds capable of reversibly intercalating and deintercalating Li ions are used as the positive electrode and the negative electrode thereof, respectively. To improve the safety performance of the Li-ion battery, encapsulating or coating the negative electrode, adding an electrolyte passivating agent, using a strong separator, doping and encapsulating the separator, doping and encapsulating the positive electrode, or forming surface-coating layer is generally used in the prior art. Generally, a lot of additives are added, or a complicated process is used, for improving the safety performance.

However, the above-mentioned methods generally have adverse effect, e.g., the electrical performance of the Li-ion battery deteriorates significantly, the internal impedance increases, and the energy density and the power performance decrease. To meet the large-scale application of the Li-ion battery and achieve green and sustainable development, a new negative electrode material is needed to be developed.

For the above-mentioned purpose, the present application is proposed.

SUMMARY

A first purpose of the present application is to provide a negative electrode material for a secondary battery.

A second purpose of the present application is to provide a method for preparing the negative electrode material as above-mentioned.

A third purpose of the present application is to provide a secondary battery using the negative electrode material as above-mentioned as a negative electrode active material.

To achieve the purposes of the present application, technical solutions are used as follows:

The present application relates to a negative electrode material for a secondary battery. The negative electrode material includes an expanded graphite and an organic phase change material intercalated into the expanded graphite.

Preferably, a melting point of the organic phase change material is in a range of substantially from 70° C. to 150° C., preferably, in a range of substantially from 90° C. to 120° C.

Preferably, the organic phase change material is selected from a group consisting of cerotic acid, paraffin, polyethylene wax and combinations thereof.

Preferably, the organic phase change material is a mixture of paraffin and cerotic acid, or a mixture of paraffin and polyethylene wax.

Preferably, a mass ratio of the organic phase change material with respect to the expanded graphite is in a range of substantially from 1:5 to 1:10.

The present application further relates to a method for preparing the negative electrode material as above-mentioned, including at least steps of:

(1) treating a graphite under an acidic condition to obtain the expanded graphite; and (2) under a vacuum condition, intercalating the organic phase change material into the expanded graphite to obtain the negative electrode material.

Preferably, in step (1), the graphite is placed in a mixed solution of a concentrated sulfuric acid and a concentrated nitric acid, washed, dried, and placed for substantially from 5 h to 10 h under a vacuum degree of substantially from −0.01 MPa to −0.1 MPa so as to obtain the expanded graphite, preferably, a concentration of the concentrated sulfuric acid is in a range of substantially from 70% to 98% by mass, a concentration of the concentrated nitric acid is in a range of substantially from 50% to 65% by mass, and a volume percentage of the nitric acid in the mixed solution is in a range of substantially from 2% to 7%.

Preferably, step (2) is performed under a vacuum degree of substantially from −0.01 MPa to −0.1 MPa, preferably, the vacuum degree is kept for substantially from 0.5 h to 2 h after the liquid phase change material is intercalated into the expanded graphite.

The present application further relates to a negative electrode plate, including a current collector and a negative electrode film plate, wherein the negative electrode film plate includes the negative electrode material, a conductive agent and a binder, and a mass ratio of the negative electrode material, the conductive agent and the binder is in a range of substantially (89-98):(0-3):(1-3).

The present application further relates to a secondary battery, including the negative electrode plate as above-mentioned.

The technical solutions of the present application have at least advantages as follows:

For the negative electrode material provided by the present application, the organic phase change material is intercalated into the expanded graphite, thus, when an internal temperature of the secondary battery increases, the organic phase change material absorbs heat by phase change, which is able to improve the heat storage capacity, energy storage capability and the safety performance. In addition, the organic phase change material has certain viscosity and flexibility, which can improve the adhesion performance of the negative material on the current collector.

BRIEF DESCRIPTION OF DRAWINGS

The FIGURE is an SEM image of a negative electrode material according to an embodiment of the present application.

DESCRIPTION OF EMBODIMENTS

In order to facilitate better understanding of the technical solutions of the present application, a detailed description of the embodiments of the present application will be provided. It should be understood that, these embodiments are merely used to illustrate the present application, rather than limit the present application.

The present application relates to a negative electrode material. The negative electrode material includes an expanded graphite and an organic phase change material intercalated into the expanded graphite.

A normal graphite has an interlayer spacing of 0.335 nm and a bonding energy of 16.7 kJ/mol, which provides structural conditions for intercalation of an intercalation material. Carbon atom is an electronegative atom located in the middle of the periodic table and can combine with both metal atoms and non-metal atoms, which provides various conditions for intercalation of intercalation materials. In the present application, an artificial graphite or a natural graphite is used as the negative electrode material, and the artificial graphite or natural graphite is intercalated by vacuum intercalation with an organic phase change material, such as paraffin wax and derivatives thereof, such that the safety performance is improved, and negative influence to the internal impedance and deterioration of the power performance are reduced. In embodiments of the present application, the Li-ion battery is selected as the secondary battery.

Under long time using or high temperature condition, when an internal short circuit occurs to the Li-ion battery, a high temperature on a short circuit point makes the expanded graphite rapidly expand to no less than a hundred times more than an original volume of the expanded graphite, thereby forming a porous carbonization layer with a strong thermostability and a thermal insulation function. The organic phase change material deintercalated from the expanded graphite can absorb a large amount of latent heat, improve a flame retardance of the Li-battery by cooperating with the porous carbonization layer, and block spreading of the thermal runaway around the short circuit point, so that the safety performance of the battery is effectively improved. Due to the chemically stability, the expanded graphite in the negative electrode won't be involved in an electrochemical reaction. The organic phase change material intercalated into the expanded graphite has no contact with the electrolyte, so that the electrical performance of the Li-ion battery won't be influenced significantly.

Generally, a range of an overcharge failure temperature of the Li-ion battery is in a range of from about 90° C. to about 120° C. In that temperature range, a solid electrode interface film (abbreviated as SEI film) will decompose, the electrolyte generates gas, and the cathode generates oxygen, which negatively influences the thermal stability and results in the thermal runaway and the thermal failure. In the present application, preferably, the melting point of the organic phase change material is in a range of from about 70° C. to about 150° C. That is to say, when the internal temperature of the battery rises to 70° C., the organic phase change material absorbs latent heat and then is converted into liquid from solid, which avoids further increase of the internal temperature. More preferably, the melting point of the organic phase change material is in a range of from about 90° C. to about 120° C.

An inorganic phase change material is mainly alkali metal salt or alkaline earth metal salt, whose anion and cation are easy to react with the electrolyte, as a result, the organic phase change material is selected in the present application. In addition, compared with the inorganic phase change material, the organic phase change material has advantages of no undercold or precipitation phenomenon, stable performance, and easily adjustable phase change temperature by mixing different phase change materials. A typical organic phase change material includes paraffin, fatty acids, polyols, etc. According to a lot of experiments, in the present application, the expanded graphite and at least one of cerotic acid, paraffin, and polyethylene wax are used to prepare the intercalated negative electrode material, which achieves a good effect. The above-mentioned cerotic acid, paraffin and polyethylene wax are important industrial raw materials. Paraffin is a mixture of solid higher alkane whose main component has a molecular formula of $C_nH_{2n+2}$, wherein n=17-35. Since the paraffin is a mixture, it has an unfixed melting point in a range of from 80° C. to about 90° C. Cerotic acid refers to hexacosanic acid having a fixed melting point in a range of 86° C.-89° C. Polyethylene wax has a relative molecular mass in a range of from about 1000 to about 4000, and a melting point in a range of from about 90° C. to about 120° C.

Usage of an organic phase change material compounded by different types of phase change components can further expand the melting point range, and thus the organic phase change material can be liquefied at a relatively low temperature, therefore, the organic phase change material of the present application preferably includes at least two types of organic phase change components. Additionally, since the paraffin is a mixture having a melting point in a wide range, preferably, the organic phase change material is a mixture of paraffin and cerotic acid, or a mixture of paraffin and polyethylene wax. More preferably, a mass ratio of paraffin to cerotic acid or paraffin to polyethylene wax is about 1:1.

As an improvement of the negative electrode material for the secondary battery of the present application, a mass ratio of the organic phase change material with respect to the expanded graphite is from about 1:5 to about 1:10. More preferably, an upper limit value of the mass ratio of the organic phase change material with respect to the expanded graphite is 20%, 18%, 17% or 16%, and a lower limit value of the mass ratio of the organic phase change material with respect to the expanded graphite is 15%, 14%, 12% or 10%. If a content of the organic phase change material is too low, a modification to the expanded graphite will be not significant. If a content of the organic phase change material is too high, a content of the expanded graphite as a conductive agent in the negative electrode plate will decrease and the organic phase change material will cover a surface of the expanded graphite, which will cause adverse influence to conductive function of the expanded graphite.

The present application further relates to a method for preparing the negative electrode material. The method for preparing the negative electrode material includes at least steps of:

(1), treating a graphite under an acidic condition to obtain the expanded graphite; and (2), under a vacuum condition, injecting the organic phase change material in a liquid state into the expanded graphite, to obtain the negative electrode material.

As an improvement of the method for preparing the negative electrode material of the present application, in step (1), the graphite is placed in a mixed solution of concentrated sulfuric acid and concentrated nitric acid, stirred for about 0.5 h-2 h at about 40° C.-60° C., water washed to be neutral, dried, and placed for about 5 h-10 h under a vacuum degree of from about −0.01 MPa to about −0.1 MPa, such that the expanded graphite is obtained. The concentrated sulfuric acid and concentrated nitric acid are used as an intercalation agent and an oxidization agent. A concentration of the concentrated sulfuric acid is in a range of from about 70% to about 98% by mass, preferably, about 98% by mass.

A concentration of the concentrated nitric acid is in a range of from about 50% to about 65% by mass, preferably, about 65% by mass. A volume percentage of the nitric acid in the mixed solution is in a range of from about 2% to about 7%, preferably, about 5%.

As an improvement of the method for preparing the negative electrode material of the present application, in step (2), under a vacuum degree of from about −0.01 MPa to about −0.1 MPa, preferably, after intercalating the liquid phase change material into the expanded graphite, the vacuum degree is kept for about 0.5 h-2 h, so as to intercalate the organic phase change material into the expanded graphite.

The present application further relates to a negative electrode plate. The negative electrode plate includes a current collector and a negative electrode film plate. The negative film plate includes the negative electrode material, a conductive agent and a binder, and a mass ratio of the negative electrode material, the conductive agent and the binder is about (89-98):(0-3):(1-3). The conductive agent is selected from a group consisting of conductive carbon black, conductive graphite, carbon nanotube, grapheme and combinations thereof. The binder is at least one of polymer binders, preferably, the binder is polyvinylidene fluoride and/or polytetrafluoroethylene.

The present application further relates to a Li-ion battery including the above-mentioned negative electrode plate. The Li-ion battery includes a positive current collector, a positive electrode film plate coated on the positive current collector, a negative current collector, a negative electrode film plate coated on the negative current collector, a separator, and an electrolyte. In addition, the Li-ion battery is of a winded type or a stacked type.

The present application is illustrated in details with reference to embodiments. However, the present application is not limited to those embodiments.

In the embodiments, the organic phase change materials, such as paraffin, cerotic acid, polyethylene wax, and stearic acid, are commercially available from Henan RuiLong Chemicals Co., LTD. The conductive carbon black is commercially available from Shanghai Kaj et chemical technology Co., LTD.

Embodiment 1

Preparation for the Negative Electrode Material

An artificial graphite is placed in a mixed solution of concentrated sulfuric acid and concentrated nitric acid. A concentration of the concentrated sulfuric acid is 98% by mass, and a concentration of the concentrated nitric acid is 65% by mass. A volume percentage of the concentrated nitric acid in the mixed solution is 5%. The above mixture is stirred for about 0.5 h-2 h at a temperature of about 40° C.-60° C., filtered, washed to pH=7, and placed for about 5 h-10 h in a vacuum tank under a vacuum degree of from about −0.01 MPa to about −0.1 MPa, thereby obtaining an expanded graphite. One kind or two kinds of the organic phase change material are melted and mixed uniformly at about 100° C., and intercalated into the expanded graphite under a pressure of from about −0.01 MPa to about −0.1 MPa and kept for about 0.5 h-2 h, thereby obtaining a negative electrode material. After keeping the pressure, the redundant organic phase change material on a surface of the negative electrode material is removed. Types and mixing ratio of the organic phase change material, the mass ratio of the expanded graphite to the organic phase change material, and the mixing time are listed in Table 1. The FIGURE is an SEM image of the negative electrode material of Battery 4, which shows that the interlayer spacing of the graphite has increased, but doesn't show the organic phase change material because the organic phase change material has been intercalated into the graphite.

Preparation for the Negative Electrode Plate

The negative electrode material obtained as above, SP as a conductive agent, Styrene-butadiene as a binder, and carboxymethyl cellulose (CMC) as a thickening agent are mixed on in a weight ratio of about 96.2:1.5:1.5:0.8, then, deionized water as a solvent is added and then stirred to mix uniformly, thereby obtaining a negative electrode slurry. The negative electrode slurry is uniformly coated on a current collector, i.e., a copper foil, dried at about 80° C.-90° C., cold-pressed, trimmed, cut into piece, stripped, and then dried for about 4 h at about 110° C. under vacuum, thereby obtaining the negative electrode plate.

Preparation for the Positive Electrode Plate $LiNi_{1/3}Mn_{1/3}Co_{1/3}O_2$ (NCM333) as a positive electrode active material, carbon black SP as a conductive agent, and polyvinylidene fluoride as a binder are mixed in a mass ratio of about 97:2:1, then, N-methyl-2-pyrrolidone as a solvent is added and stirred uniformly under vacuum, thereby obtaining a positive electrode slurry. The positive electrode slurry is then coated uniformly on the positive current collector, i.e., an aluminum foil, dried at about 85° C., cold-pressed, trimmed, cut into piece, stripped, and then dried for about 4 h at about 85° C. under vacuum, thereby obtaining the positive electrode plate.

Preparation for the Li-Ion Battery

Polyethylene separator with a thickness of 12 μm is used as the separator the Li-ion battery. A molar concentration of Lithium Hexafluorophosphate in the electrolyte is 1 mol/L. The organic solvent in the electrolyte consists of ethylene carbonate, dimethyl carbonate, and 1, 2-propylene carbonate in a volume ratio of 1:1:1.

The negative electrode plate, the separator and the positive electrode plate are sequentially stacked, the separator is sandwiched between the negative electrode plate and the positive electrode plate, and then the three are winded to form a bare cell with a thickness of 8 mm, a width of 60 mm and a length of 130 mm. The bare cell is placed in an aluminum package, dried for 10 h at 75° C. under vacuum, injected with non-aqueous electrolyte, vacuum packaged, standing for 24 h, then charged to a voltage of 4.2V under a constant current of 0.1 C (160 mA), further charged to a current of 0.05 C (80 mA) under a constant voltage of 4.2V, discharged to a voltage of 3.0V under a constant current of 0.1 C (160 mA), then once again charged, further charged and discharged as above, and lastly, charged to a voltage of 3.8V under a constant current of 0.1 C (160 mA), thereby finishing a process of preparing the Li-ion secondary battery.

TABLE 1

| Battery No. | Negative electrode plate No. | Organic phase change material (mass ratio) | Mass ratio of organic phase change material to expanded graphite | Time for keeping pressure |
|---|---|---|---|---|
| Battery 1 | electrode plate 1 | paraffin | 1:10 | 0.5 h |
| Battery 2 | electrode plate 2 | cerotic acid | 1:10 | 0.5 h |
| Battery 3 | electrode plate 3 | polyethylene wax | 1:10 | 0.5 h |
| Battery 4 | electrode plate 4 | Paraffin + cerotic acid (1:1) | 1:10 | 0.5 h |

TABLE 1-continued

| Battery No. | Negative electrode plate No. | Organic phase change material (mass ratio) | Mass ratio of organic phase change material to expanded graphite | Time for keeping pressure |
|---|---|---|---|---|
| Battery 5 | electrode plate 5 | Paraffin + cerotic acid (1:1) | 1:5 | 1 h |
| Battery 6 | electrode plate 6 | Paraffin + polyethylene wax (1:1) | 1:5 | 1 h |
| Battery 7 | electrode plate 7 | Paraffin + cerotic acid (1:1) | 1:15 | 0.5 h |
| Battery 8 | electrode plate 8 | Paraffin + cerotic acid (1:1) | 1:3 | 0.5 h |
| Battery 9 | electrode plate 9 | Paraffin + cerotic acid (1:2) | 1:10 | 0.5 h |
| Battery 10 | electrode plate 10 | Paraffin + cerotic acid (2:1) | 1:10 | 0.5 h |

Comparative Example 1

Preparations for a negative electrode plate, a positive electrode plate, and a battery of Batteries 1#-3# of Comparative example 1 are similar to those of Embodiment 1. However, a composition and a preparing process of a negative electrode material are different and are illustrated in Table 2.

TABLE 2

| Battery No. | Negative electrode plate No. | Organic phase change material (mass ratio) | Mass ratio of organic phase change material to expanded graphite | Time of keeping pressure |
|---|---|---|---|---|
| Battery 1# | electrode plate 1# | — | — | — |
| Battery 2# | electrode plate 2# | paraffin + cerotic acid (1:1) | 1:10 | — |
| Battery 3# | electrode plate 3# | Stearic acid | 1:10 | 0.5 h |

For Battery 1#, the artificial graphite is directly used as the negative electrode active material, and no organic phase change material is used.

For Battery 2#, the organic phase change material is a mixture of paraffin and cerotic acid in a mass ratio of 1:1. A mass ratio of the organic phase change material to the artificial graphite is 1:10, however, the organic phase change material has not been intercalated into the expanded graphite under vacuum, but the organic phase change material is merely mixed with the expanded graphite and then the mixture is used as the negative electrode active material.

For Battery 3#, stearic acid is used as the organic phase change material, and according to the method of Embodiment 1, is intercalated into the expanded graphite under vacuum to obtain the negative electrode active material.

Testing Examples

Test of Film Plate:

A thickness of the film plate is measured by a 1/10 micrometer.

A resistance of the film plate is measured by an AC inner resistance tester cooperated with a tablet press machine.

An internal resistance of the battery is tested by an AC inner resistance tester.

Test of Battery:

The battery is fully charged under 1 C and a temperature of 25±2° C., discharged at 1 C rate, again fully charged at 1 C, and then discharged at 3 C rate. A ratio of an electric quantity released at 3 C rate to an electric quantity released at 1 C rate is measured and defined as a 3 C rate performance. A voltage is in a range of 3.0V-4.2V.

The safety performance is tested by a nailing test as follows: at a temperature of 25±2° C., a stainless steel needle with a tip angle of 30° C.-60° C. and a diameter of 5 mm penetrates through a center of the battery at a speed of 25 mm/s, and a temperature change of a surface of a cell of the battery is monitored. The test result is listed in Table 3.

TABLE 3

| No. | Thickness of negative electrode film plate (μm) | Resistance of film plate (mΩ) | Inner resistance (mΩ) | Safety performance | 3C rate discharge performance |
|---|---|---|---|---|---|
| Battery 1 | 130 | 3.1 | 1.52 | Temperature of the surface of the cell rises for 86° C., and the battery fails. | 89% |
| Battery 2 | 130 | 3.1 | 1.51 | Temperature of the surface of the cell rises for 79° C. | 89% |
| Battery 3 | 130 | 3.1 | 1.51 | Temperature of the surface of the cell rises for 70° C. | 88% |
| Battery 4 | 130 | 3.1 | 1.51 | Temperature of the surface of the cell rises for 61° C. | 88% |
| Battery 5 | 135 | 3.3 | 1.55 | Temperature of the surface of the cell rises for 47° C. | 86% |
| Battery 6 | 140 | 3.7 | 1.60 | Temperature of the surface of the cell rises for 38° C. | 85% |
| Battery 7 | 126 | 3.3 | 1.50 | Temperature of the surface of the cell rises for 89° C., and the battery fails. | 89% |

TABLE 3-continued

| No. | Thickness of negative electrode film plate (μm) | Resistance of film plate (mΩ) | Inner resistance (mΩ) | Safety performance | 3C rate discharge performance |
|---|---|---|---|---|---|
| Battery 8 | 150 | 5.0 | 2.20 | Temperature of the surface of the cell rises for 26° C. | 77% |
| Battery 9 | 130 | 3.2 | 1.52 | Temperature of the surface of the cell rises for 68° C. | 85% |
| Battery 10 | 130 | 7.2 | 3.6 | Temperature of the surface of the cell rises for 57° C. | 68% |
| Battery 1# | 125 | 2.9 | 1.48 | Temperature of the surface of the cell rises for 95° C., and the battery fails. | 90% |
| Battery 2# | 130 | 3.1 | 1.55 | Temperature of the surface of the cell rises for 94° C., and the battery fails. | 87% |
| Battery 3# | 130 | 3.1 | 1.51 | Temperature of the surface of the cell rises for 89° C., and the battery fails. | 88% |

Because the energy density of the negative electrode plate decreases due to addition of the organic phase change material, compared with Battery 1#, the thickness of the negative electrode film plates of the Embodiments increases. Comparing test results of Batteries 1-3 with those of Batteries 4-6, when overcharged, a temperature rise of the surface of the batteries with mixed organic phase change material intercalated into the expanded graphite is lower than that a temperature rise of the surface of the batteries with only one type of organic phase change material intercalated. Batteries 5 and 6 have a better safety performance as addition amounts of the mixed organic phase change material in the batteries 5 and 6 are greater, and that is to say, addition amount of the expanded graphite decreases, which causes that a 3 C rate discharge performance of the batteries becomes slightly lower. As illustrated by test results of Batteries 7-10, the addition amount and the mixing ratio of the mixed organic phase change material are needed to be in a certain range, otherwise an improvement for the safety performance of the battery is not significant, or the electric property is influenced significantly.

In Battery 1#, the artificial graphite is directly used as the negative electrode active material, and no organic phase change material is used, when discharged, the temperature rise of the surface of the cell exceeds the tolerance range of the electrolyte, which causes the failure of the battery.

In Battery 2#, although the mixed organic phase change material is used, the intercalation composition is not prepared. When discharged, the mixed organic phase change material melts and covers the surface of the expanded graphite, therefore, the latent heat cannot be absorbed and thus the safety performance cannot be improved, moreover, the expanded graphite loses conductivity, which causes the failure of the battery.

In battery 3#, stearic acid is used as the organic phase change material, the melting point of which is in a range of about 56° C.-69° C. Whether stearic acid is used alone or mixed with paraffin wax, the melting point is reduced to about 50° C.-60° C., the organic phase change material starts to evaporate at about 90° C.-100° C., the heat storage capacity gets poor, and thus a risk of the overcharge failure is not mitigated effectively.

Therefore, in the present application, the organic phase change material is intercalated into the expanded graphite, which can distinctly improve the overcharge safety performance of the Li-ion battery, influence the electrical property slightly, and achieves a beneficial effect.

The embodiments described above are merely preferred embodiments of the present application and they do not limit the present application. Any modification and amendment made within the invention concept of the present application shall fall into the scope defined by the claims of the present application.

What is claimed is:

1. A negative electrode material for a secondary battery, comprising an expanded graphite and an organic phase change material intercalated into the expanded graphite, wherein the organic phase change material is a mixture of paraffin and cerotic acid.

2. The negative electrode material for a secondary battery according to claim 1, wherein a melting point of the organic phase change material is in a range of substantially from 70° C. to 150° C., preferably, in a range of substantially from 90° C. to 120° C.

3. The negative electrode material for a secondary battery according to claim 1, wherein a mass ratio of the organic phase change material with respect to the expanded graphite is in a range of substantially from 1:5 to 1:10.

4. A negative electrode plate, comprising a current collector and a negative electrode film plate, wherein the negative electrode film plate comprises the negative electrode material according to claim 1, a conductive agent and a binder, and a mass ratio of the negative electrode material, the conductive agent and the binder is in a range of substantially (89-98):(0-3):(1-3).

5. A secondary battery, comprising the negative electrode plate according to claim 4.

* * * * *